United States Patent
Kim

(10) Patent No.: US 11,243,759 B2
(45) Date of Patent: Feb. 8, 2022

(54) DATA STORAGE DEVICE, OPERATION METHOD THEREOF, AND FIRMWARE PROVIDING SERVER THEREFOR

(71) Applicant: SK hynix Inc., Gyeonggi-do (KR)

(72) Inventor: Jung Ae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/141,729

(22) Filed: Jan. 5, 2021

(65) Prior Publication Data

US 2021/0124571 A1 Apr. 29, 2021

Related U.S. Application Data

(62) Division of application No. 16/210,916, filed on Dec. 5, 2018, now abandoned.

(30) Foreign Application Priority Data

Jul. 6, 2018 (KR) .................. 10-2018-0078669

(51) Int. Cl.
*G06F 8/654* (2018.01)
*G06F 9/24* (2006.01)
*G06F 9/445* (2018.01)

(52) U.S. Cl.
CPC ............ *G06F 8/654* (2018.02); *G06F 9/24* (2013.01); *G06F 9/445* (2013.01)

(58) Field of Classification Search
CPC ........ G06F 8/60–66; G06F 9/24; G06F 9/445; G06F 9/44505; G06F 9/44536
See application file for complete search history.

(56) References Cited

U.S. PATENT DOCUMENTS

| | | | | |
|---|---|---|---|---|
| 7,590,835 B1 * | 9/2009 | Nallagatla | ........... | G06F 9/44505 710/8 |
| 2007/0294599 A1 * | 12/2007 | Edlund | ............. | G06F 8/66 714/54 |
| 2010/0169709 A1 * | 7/2010 | Chiu | ............. | G06F 11/1433 714/16 |
| 2020/0012490 A1 * | 1/2020 | Kim | ............. | G06F 9/24 |

* cited by examiner

*Primary Examiner* — Todd Aguilera
(74) *Attorney, Agent, or Firm* — IP & T Group LLP

(57) ABSTRACT

A data storage device includes: a storage configured to store flag information on attributes, each attribute corresponding to a revision version, and firmware comprising register setting information and firmware execution code branch information for each attribute; and a controller configured to read the flag information and the firmware from the storage to execute the firmware according to the flag information.

6 Claims, 8 Drawing Sheets

| FLAG | REGISTER NAME | ADDRESS | ATTRIBUTE (R/W) | DESCRIPTION | RESET VALUE | BRANCH CONDITION | BRANCH ADDRESS |
|---|---|---|---|---|---|---|---|
| A | R1 | ~ | | | | | |
| | : | | | | | | |
| | Rn | ~ | | | | | |
| B | R1 | ~ | | | | | |
| | : | | | | | | |
| | Rn | ~ | | | | | |
| C | R1 | ~ | | | | | |
| | : | | | | | | |
| | Rn | ~ | | | | | |
| : | : | : | : | : | | | |

FIG.2A

| FLAG | REGISTER NAME | ADDRESS | ATTRIBUTE (R/W) | DESCRIPTION | RESET VALUE | BRANCH CONDITION | BRANCH ADDRESS |
|---|---|---|---|---|---|---|---|
| A | R1 | ? | | | | | |
|  | ... | | | | | | |
|  | Rn | | | | | | |
| B | R1 | ? | | | | | |
|  | ... | ? | | | | | |
|  | Rn | | | | | | |
| C | R1 | ? | | | | | |
|  | ... | ? | | | | | |
|  | Rn | | | | | | |
| ... | ... | ? | ... | ... | | | |

FIG.2B
| REGISTER NAME | BIT | DESCRIPTION | RESET VALUE |
|---|---|---|---|
| R1 | [ : ] | | |
| ⋮ | ⋮ | | |
| Rn | [ ] | | |
| ⋮ | ⋮ | ⋮ | ⋮ |
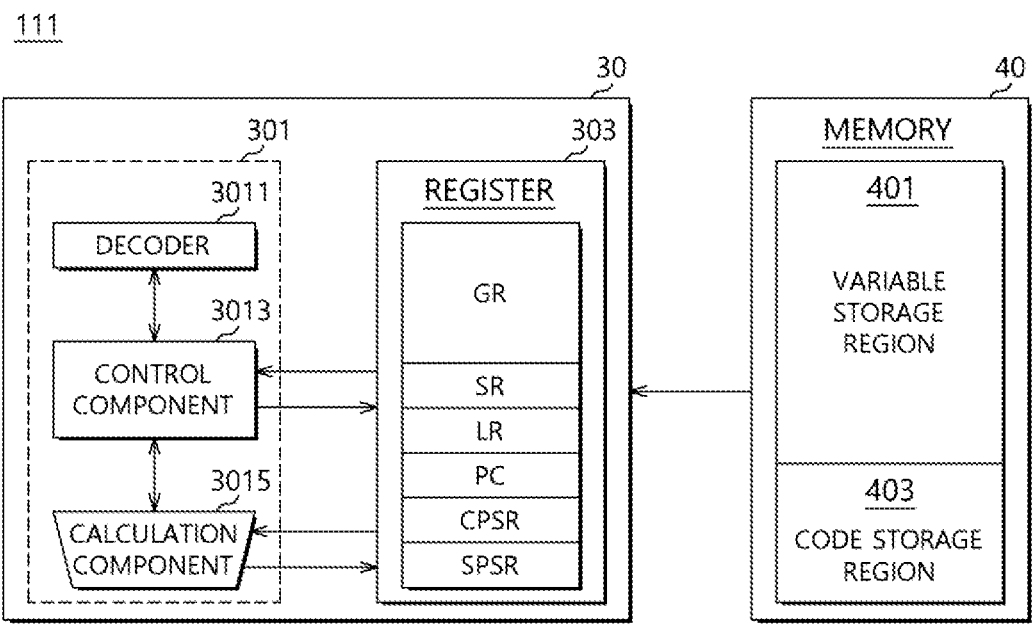
FIG.3
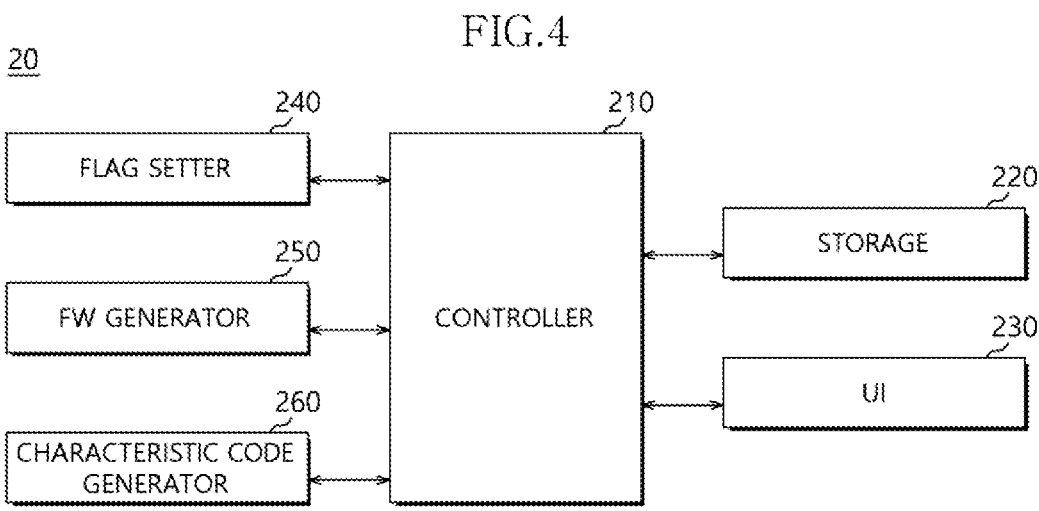
FIG.4

DATA STORAGE DEVICE, OPERATION METHOD THEREOF, AND FIRMWARE PROVIDING SERVER THEREFOR

CROSS-REFERENCE TO RELATED APPLICATION

This application is a division of U.S. patent application Ser. No. 16/210,916 filed on Dec. 5, 2018, which claims benefits of priority of Korean Patent Application No. 10-2018-0078669 filed on Jul. 6, 2018. The disclosure of each of the foregoing application is incorporated herein by reference in its entirety.

BACKGROUND

1. Technical Field

Various embodiments generally relate to a semiconductor integrated device, and more particularly, to a data storage device, an operation method thereof, and a firmware providing server therefor.

2. Related Art

A semiconductor device such as a memory device is continuously being developed to attain higher integration, higher capacity and higher performance, which increases the operation speed thereof.

Such a semiconductor device is advantageous in that it has high capacity data storage, but an occurrence rate of a defect or a bug may also increase. Accordingly, even after a product is released, it is necessary to continuously monitor the performance of the product for any defect or bug therein.

If such a defect or bug is detected, revision may be performed. Revision refers to correction or compensation for a deficiency such as a bug or a defect in an initial product, which has been already released, and a product revised and released again is referred to as a revision product. Accordingly, the revision product may be manufactured by changing a part of the specification of a first-released product.

In other words, the revision product may be different from the first-released product in specification, but is derived from the first released product. Therefore, it is necessary to systemically manage the first-released product and the revision product derived therefrom.

SUMMARY

In an embodiment, a data storage device may include: a storage configured to store flag information on attributes, each attribute corresponding to a revision version, and firmware comprising register setting information and firmware execution code branch information for each attribute; and a controller configured to read the flag information and the firmware from the storage to execute the firmware according to the flag information.

In an embodiment, an operation method of a data storage device, which includes a storage unit and a controller, may include: storing, to a set region of the storage, flag information on attributes, each attribute corresponding to a revision version, and firmware comprising register setting information and firmware execution code branch information for each attribute; and reading, by the controller, the flag information and the firmware from the storage to execute the firmware according to the flag information.

In an embodiment, a firmware providing server, which is configured to provide firmware to a data storage device, may include: a flag setter configured to determine an attribute of flag information corresponding to a revision version of the data storage device, the flag information including attributes; and a firmware generator configured to generate firmware necessary to operate the data storage device, change the firmware so as to reflect register setting information and firmware execution code branch information according to the revision version of the data storage device, the register setting information and firmware execution code branch information being set for each attribute, and provide the changed firmware and the determined attribute of the flag information to the data storage device.

In an embodiment, a system may include: a data storage device; and a firmware providing server suitable for performing at least one revision on firmware for the data storage device, generating the firmware including register setting information and firmware execution code branch information, and flag information, based on the at least one revision, the flag information including attributes corresponding to versions of the firmware, and providing the firmware and the flag information to the data storage device, and wherein the data storage device is suitable for: receiving the firmware and the flag information from the firmware providing server, and executing the firmware by calling the register setting information and the firmware execution code branch information based on one attribute selected from the flag information.

BRIEF DESCRIPTION OF THE DRAWINGS

FIGS. 2A and 2B are diagrams illustrating firmware changes according to a revision version.

FIG. 3 is a diagram illustrating a central processing unit in accordance with an embodiment.

FIG. 4 is a diagram illustrating a firmware providing server in accordance with an embodiment.

DETAILED DESCRIPTION

Embodiments will be described in detail with reference to the accompanying drawings. Throughout the specification, reference to "an embodiment" and the like is not necessarily to only one embodiment, and different references to any such phrase are not necessarily to the same embodiment(s).

Figure 1:
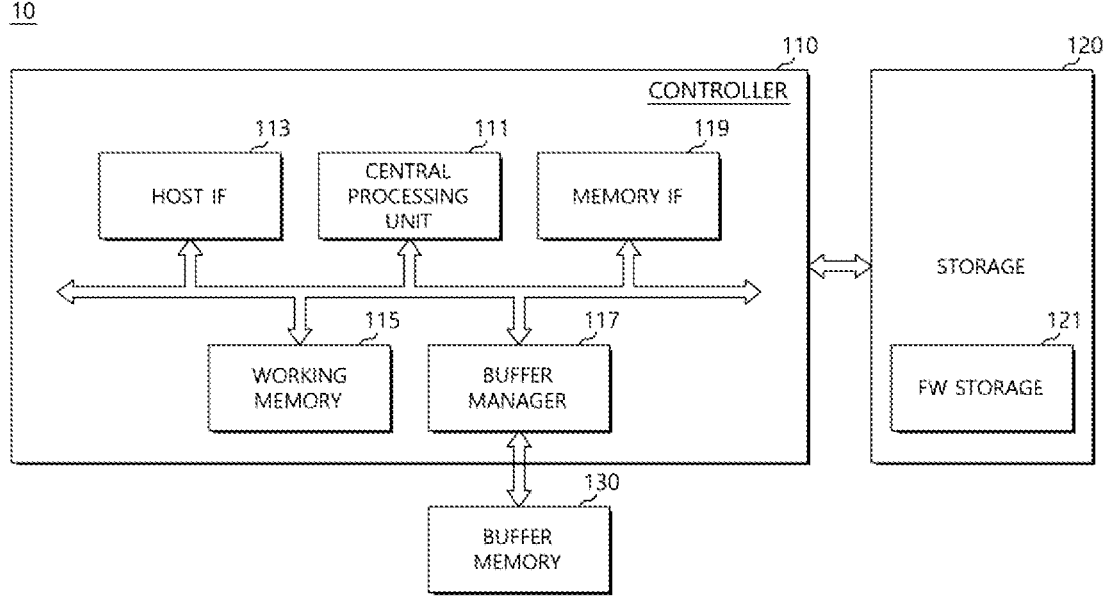
FIG. 1 is a diagram illustrating a data storage device in accordance with an embodiment.

FIG. 1 is a diagram illustrating a data storage device 10 in accordance with an embodiment.

Referring to FIG. 1, the data storage device 10 may include a controller 110 and a storage 120.

The controller 110 may control the storage 120 in response to a request from a host device. For example, the controller 110 may write data to the storage 120 according to a program (or write) command, an access address, and the data provided from the host device. In addition, the controller 110 may read data from the storage 120 to provide the data to the host device in response to a read command and an access address from the host device.

The storage 120 may allow data to be written thereto or written data to be read therefrom according to control by the controller 110. The storage 12 may be implemented with a volatile memory device or a non-volatile memory device. In an embodiment, the storage 120 may be implemented using any of various non-volatile memory devices such as an electrically erasable and programmable read only memory (ROM) (EEPROM), a NAND flash memory, a NOR flash memory, a phase-change random access memory (RAM) (PRAM), a resistive RAM (ReRAM or RRAM), a ferroelectric RAM (FRAM), or a spin torque transfer magnetic RAM (STT-MRAM). The storage 120 may include a plurality of dies, a plurality of chips, or a plurality of packages. Furthermore, the storage 120 may be formed of a single-level cell configured to store one bit of data to one memory cell, or a multi-level cell configured to store a plurality of bits of data in one memory cell.

In an embodiment, the storage 120 may include a firmware (FW) storage 121. The firmware storage 121 may store firmware which is configured to allow hardware configuring the controller 110 to control hardware configuring the storage 120 to operate the data storage device 10. Accordingly, the controller 110 may drive the firmware to control the storage 120.

In an embodiment, a specific region of the storage 120 may have specific capacity and be allocated to the firmware storage 121. The region may be protected such that user access to data therein is not permitted or restricted so that the firmware stored therein is not manipulated.

In an embodiment, the firmware stored in the firmware storage 121 may be frequently updated for the purposes of correcting errors in the firmware, improving performance of the data storage device 10, adding a function, or the like.

The data storage device 10 may receive a new version of firmware from the host device and update the firmware storage 121 in the storage 120 in order to update the firmware.

The controller 110 may include a central processing unit (CPU) 111, a host interface (IF) 113, a working memory 115, a buffer manager 117, and a memory interface (IF) 119.

The central processing unit 111 may read the firmware stored in the firmware storage 121 and drive the read firmware. The firmware driven by the central processing unit 111 may process a request from the host device and control the entire operations of the storage 120. In an embodiment, the central processing unit 111 may be configured to deliver various kinds of control information necessary for data read or write operations for the storage 120 to the host interface 113, the working memory 115, the buffer manager 117, and the memory interface 119. In an embodiment, the central processing unit 111 may execute a function of a flash transformation layer (FTL) configured to perform garbage collection, address mapping, wear leveling, error detection or correction, or the like for managing the storage 120.

The host interface 113 may receive a command and a clock signal from the host device (or a host processor) and provide a communication channel to control input and output of data, according to a control by the central processing unit 111. In particular, the host interface 113 may provide a physical connection between the host device and the data storage device 10. In addition, the host interface 113 may provide interfacing between the host device and the data storage device 10 in accordance with a bus format of the host device. The bus format of the host device may include at least one among standard interface protocols such as secure digital, a universal serial bus (USB), a multi-media card (MMC), an embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI Express (PCI-e or PCIe), or universal flash storage (UFS).

The working memory 115 may store program codes, for example, firmware or software, that are necessary for an operation of the controller 110, and also store code data used by the program codes. In an embodiment, after the storage 120 is booted, the firmware stored in the firmware storage 121 may be delivered and loaded to the working memory 115, and then executed by the central processing unit 111. In an embodiment, the firmware may be stored in the working memory 115 without the firmware storage 121 separately provided in the storage 120.

The working memory 115 may be a non-transitory machine-readable medium such as a random access memory (RAM), a storage-class memory (SCM), a non-volatile memory (NVM), a flash memory, or a solid state drive (SSD) that may store the program codes.

The buffer manager 117 may be configured to temporarily store data, which is transmitted to and received from the host device at the time of an input/output operation for the storage 120, in the buffer memory 130. The buffer manager 117 may be configured to manage a usage state of the buffer memory 130.

The buffer memory 130 may be implemented with a storage medium having a high data reading/writing speed, and for ease of reading, frequently used information such as a logical address of a data block, or write-in time information may be stored therein. The buffer memory 130 may be a non-transitory machine readable medium such as a RAM, a SCM, an NVM, a flash memory, or an SSD that may store data, but is not limited thereto.

FIG. 1 illustrates a configuration in which the buffer memory 130 is located externally to the controller 110, but the buffer memory 130 may be also provided in the controller 110 and managed by the buffer manager 117.

Figure 12:
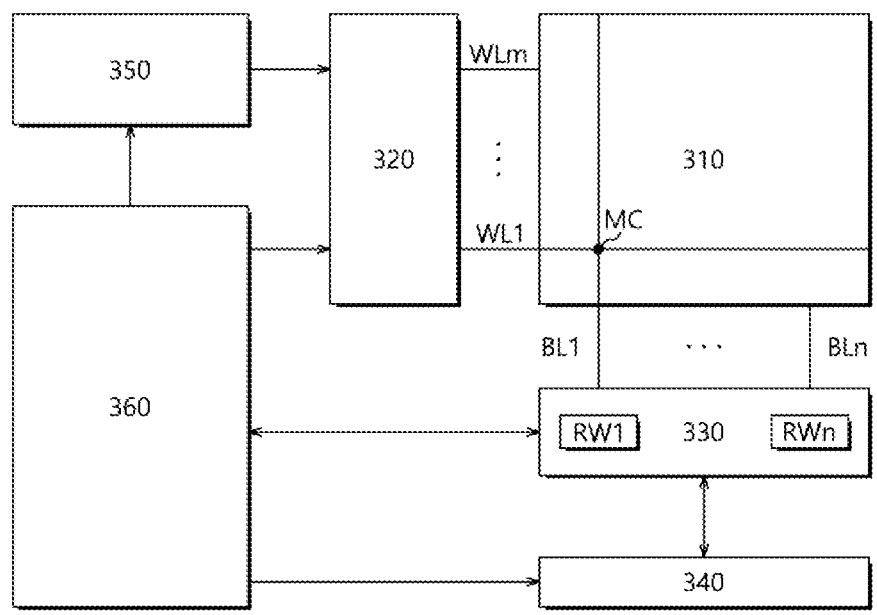
FIG. 12 is a block diagram illustrating a nonvolatile memory device included in a data storage device in accordance with an embodiment.

The working memory 115 and the buffer memory 130 may be integrated as a single component, or separately disposed as shown in FIG. 12.

The memory interface 119 may provide a communication channel configured to transmit and receive a signal between the controller 110 and the storage 120. The memory interface 119 may write data temporally stored in the buffer memory 130 to the storage 120 according to control by the central processing unit 111. In addition, the memory interface 119 may deliver data read from the storage 120 to the buffer memory 130 to be temporally stored therein.

The data storage device 10 may receive firmware from a firmware providing server (e.g., firmware providing server 20 of FIG. 4) to be described later and store the firmware in the firmware storage 121 of the storage 120 or the working memory 115.

The firmware providing server may provide, to the data storage device 10, a flag having attributes to be determined based on a revision result of the data storage device 10, and a firmware binary file including register setting information and firmware execution code branch information for each flag attribute.

FIGS. 2A and 2B are diagrams illustrating firmware changes according to a revision version.

Referring to FIG. 2A, the firmware providing server may determine the flag attribute (A, B, or C, . . . ) based on the revision result of the data storage device 10. In addition, the firmware providing server may provide, to the storage 10, the firmware binary file including the register setting information and the firmware execution code branch information for each flag attribute.

In an embodiment, as shown in FIG. 2A, the register setting information may include register names R1 to Rn, addresses (e.g., start address and offset), attributes (i.e., whether being readable/writable (R/W)), register description (function), and/or a reset value.

Furthermore, as shown in FIG. 2B, the register setting information may include a detailed description of a function assigned to each bit and a reset value for each of the registers R1 to Rn.

In an embodiment, as shown in FIG. 2A, the firmware execution code branch information may include a branch condition and a branch address.

Setting the register is a series of operations for recording and holding specific data in a register of a designated (or generated) address by the central processing unit 111. The number and addresses of registers to be set may differ according to the revision result. Even for the same register, the register setting information, namely, an allocation address, an attribute, and a function (or description) for each register, or a detailed function assigned to each bit may be changed, or the branch information of the firmware execution code may be changed. In an embodiment, such pieces of information may be included in the firmware and applied to each revision product.

In an embodiment, firmware or an application program executable in the central processing unit 111 may be primarily generated in a high-level language, for example, C-language (*.c file). A source file generated in a high-level language may be converted to an assembly file through a compiler (*.s file). The assembly file may be generated again in a format of an execution file (*.elf) that is executable by the assembler. Finally, binary information only formed in a machine language may be extracted from the execution file to generate a binary file (*.bin).

In an embodiment, the firmware may include at least one subprogram. Each subprogram may have an identical execution sequence or subprograms may have different execution sequences according to the revision version of the data storage device 10. Accordingly, the branch information in which a subprogram execution sequence is defined for each revision version may be generated. The branch information may be called to drive the firmware on the basis of a flag having an attribute according to the revision result.

In an embodiment, the firmware providing server may generate a characteristic code including the flag as a program code and include the program code as a part of the firmware.

The data storage device 10 may store flag and firmware, or firmware including the flag characteristic code received from the firmware providing server in a set storage region. The central processing unit 111 drives the firmware for operation of the data storage device 10. Here, the central processing unit 111 may set the register according to the attribute of the flag, or execute the firmware according to the branch information in the firmware. The central processing unit 111 may be also referred to as a microprocessor or a microcontroller.

In an embodiment, the register setting information may include an address, a function, an attribute, or the like for each register.

FIG. 3 is a diagram illustrating a central processing unit in accordance with an embodiment, for example, the central processing unit 111 of FIG. 1.

Referring to FIG. 3, the central processing unit 111 may include a processor 30 and a memory 40. In an embodiment, the memory 40 may be the working memory 115 shown in FIG. 1, but is not limited thereto.

The processor 30 may include a core 301 and a register 303.

The core 301 may include a decoder 3011, a control component 3013, and a calculation component 3015.

The decoder 3011 may be configured to interpret an instruction provided from the memory 40 in which the program code is stored.

The control component 3013 may be configured to convert the instruction interpreted by the decoder 3011 to a control signal corresponding thereto to generate the control signal.

The calculation component 3015 may be configured to perform an arithmetic/logical calculation or operation in response to the control signal having provided from the control component 3013.

The register 303 may be a space configured to store an address, data, or the like used by the central processing unit 111. According to the usage, the register 303 may be classified into a general-purpose register GR, a status register SR, a link register LR, a program counter PC, a current program status register CPSR, and a saved program status register SPSR.

The general-purpose register GR may be used for data operation.

The status register SR may store a status of a currently operating process, a process status of a previous operation mode, or the like.

The link register LR may designate an address to be returned from a subroutine or an address to return after an interrupt process.

The program counter PC may store an address of an instruction that is currently being executed by the central processing unit 111, namely, a location of a memory from which a program is to be read.

The current program status register CPSR may store an operation result of a currently being executed program, an execution mode of the core 301, or the like.

The saved program status register SPSR may be configured to back up the previous CPSR.

The memory 40 may be partitioned into a variable storage region 401 and a code storage region 403.

The variable storage region 401 may store variables such as a global area variable and/or a local area variable. The code storage region 403 may store an execution code in a binary format.

The firmware binary file and the variables are loaded in the memory in order to drive the firmware. Under the control of the control component 3013, the execution code at a memory address that is currently being indicated by the PC of the register 303 is latched to the core 301 (i.e., fetch process). The latched execution code is interpreted by the decoder 3011 (i.e., decode process). The interpreted code is delivered to the calculation component 3015 to be executed under the control of the control component 3013 (i.e., execute process).

Such fetch, decode, and execute processes are repeated and the execution code is executed.

In an embodiment, the register setting information and the firmware execution code branch information are called on the basis of the flag attributes at the time of execution of the firmware. Next, the register 303 of the processor 30 is set on the basis of the called register setting information and the firmware execution code branch information, and then a subprogram configuring the firmware may be executed.

FIG. 4 is a diagram illustrating a firmware providing server 20 in accordance with an embodiment.

Referring to FIG. 4, the firmware providing server 20 may include a controller 210, a storage 220, a user interface (UI) 230, a flag setter 240, a firmware (FW) generator 250, and a characteristic code generator 260.

The controller 210 may be configured to control the entire operations of the firmware providing server 20. The controller 210 may be implemented with a central processing unit (CPU).

The storage 220 may include a main storage device and an auxiliary storage device, and store a program, control data, an application program, an operation parameter, a processing result, and/or the like necessary for operation of the firmware providing server 20.

The user interface 230 may include an input device interface and an output device interface in order to provide an environment in which an operator (or user) may access the firmware providing server 20.

The flag setter 240 may be configured to determine the flag attribute on the basis of the revision result of the data storage device 10, and store the flag attribute for each revision version of the data storage device 10.

The firmware generator 250 may generate the firmware, which is substantially the firmware binary file, necessary for an operation of the data storage device 10. Furthermore, the firmware generator 250 may change the firmware such that the register setting information and the firmware execution code branch information are reflected thereto according to the revision result. Accordingly, the firmware (or binary file) may include the register setting information and the firmware execution code branch information for each flag attribute.

In an embodiment, the firmware providing server 20 may provide the flag determined by the flag setter 240 and the firmware binary file changed by the firmware generator 250 to the data storage device 10.

In an embodiment, the firmware providing server 20 may further include a characteristic code generator 260. The characteristic code generator 260 may generate characteristic information including a flag having the attribute determined according to the revision result of the data storage device 10 as a program code.

In this case, the firmware generator 250 may generate the firmware binary file so as to include the characteristic code. In other words, the firmware generator 250 may include the characteristic code as a part of the firmware.

In an embodiment, the firmware providing server 20 may provide the firmware including the flag characteristic code to the data storage device 10 of FIG. 1.

In an embodiment, the firmware may include at least one subprogram. Each subprogram may include a header and an executable code part. The characteristic code may be linked with the subprogram to be included in the firmware.

Figure 5:
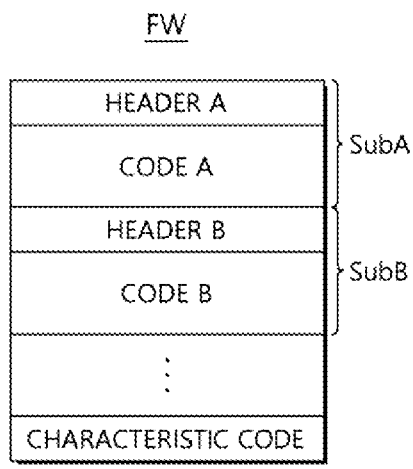
FIG. 5 is a diagram illustrating firmware in accordance with an embodiment.

FIG. 5 is a diagram illustrating a firmware in accordance with an embodiment.

Referring to FIG. 5, the firmware FW may be a set of subprograms including Sub A and Sub B. In another embodiment, the firmware FW may include a single subprogram.

Each subprogram, e.g., Sub A and Sub B, may include a header part and an execution code part. For example, the subprogram Sub A may include a header part HEADER A and an execution code part CODE A. The header part may store processor information, and a start location, an offset, the size, and link information of each subprogram. An executable code may be recorded in the code part.

The characteristic code in which the flag attribute is coded may be recorded in the characteristic code part.

The data storage device 10 may store the flag and firmware, or the firmware including the flag characteristic code received from the firmware providing server in a set storage region.

The setting information on the register that forms the processor 30 may be defined in the firmware according to the specification of the data storage device 10. Therefore, the setting information on the register may be generated in correspondence to the flag attribute information generated according to the revision result of the data storage device 10 and then included in the firmware.

In addition, each subprogram, e.g., Sub A and Sub B, may have an identical execution sequence, or the subprograms may have different execution sequences according to the revision version of the data storage device 10. Accordingly, each subprogram, e.g., Sub A and Sub B, may generate the firmware execution code branch information for which the subprogram execution sequence is defined for each revision version. The firmware may be driven by calling the firmware execution code branch information on the basis of the flag having the attribute according to the revision result.

Figure 6:
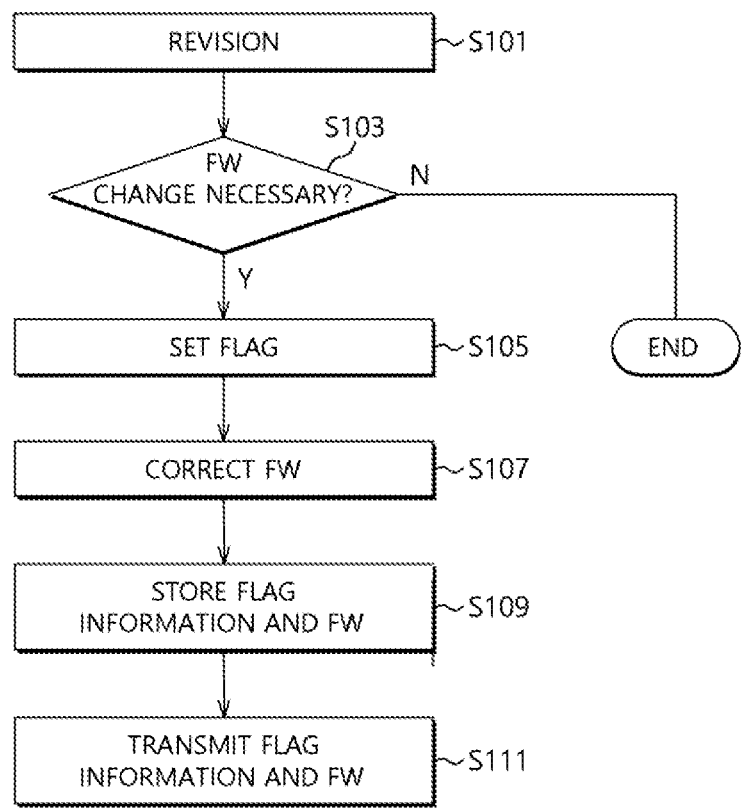
FIG. 6 is a flowchart illustrating a firmware providing method in accordance with an embodiment.

FIG. 6 is a flowchart illustrating a firmware providing method in accordance with an embodiment.

Even a product (i.e., data storage device) that has been released already may require monitoring of its performance to determine whether it has a defect or a bug. According to the monitored result, a revision product may be released.

Referring to FIG. 6, revision may be performed (operation S101). The revision is a process to find out and compensate for a deficiency such as a bug or a defect in an initial product that has been already released. According to the revision result, the revision product may be released.

According to the revision result, it may be determined whether it is necessary to change the firmware to correct an error in the firmware itself or to improve system performance (operation S103). When it is determined that it is necessary to change the firmware (operation S103, Y), the flag setter 240 may determine the flag attribute on the basis of the revision result of the data storage device 10 and store the flag attribute for each revision version of the data storage device 10 (operation S105).

The firmware generator 250 may change the firmware such that the register setting information and the firmware execution code branch information are reflected thereto according to the revision result (operation S107).

In an embodiment, as shown in FIG. 2A, the register setting information may include the register names R1 to Rn, addresses (e.g., start address and offset), an attribute (i.e., whether being readable/writable (R/W)), a register description (or function), and a reset value. Further, the register setting information may include a detailed description and a reset value assigned to each bit with respect to each of the registers R1 to Rn. In addition, as shown in FIG. 2A, the firmware execution code branch information may include the branch condition and the branch address.

Accordingly, the firmware (i.e., binary file) may include the register setting information and the firmware execution code branch information for each flag attribute. The changed firmware may be stored with the flag attribute information (operation S109).

Then the firmware providing server 20 may provide (or transmit) the flag determined by the flag setter 240, and the firmware binary file changed by the firmware generator 250 to the data storage device 10 (operation S111).

Figure 7:
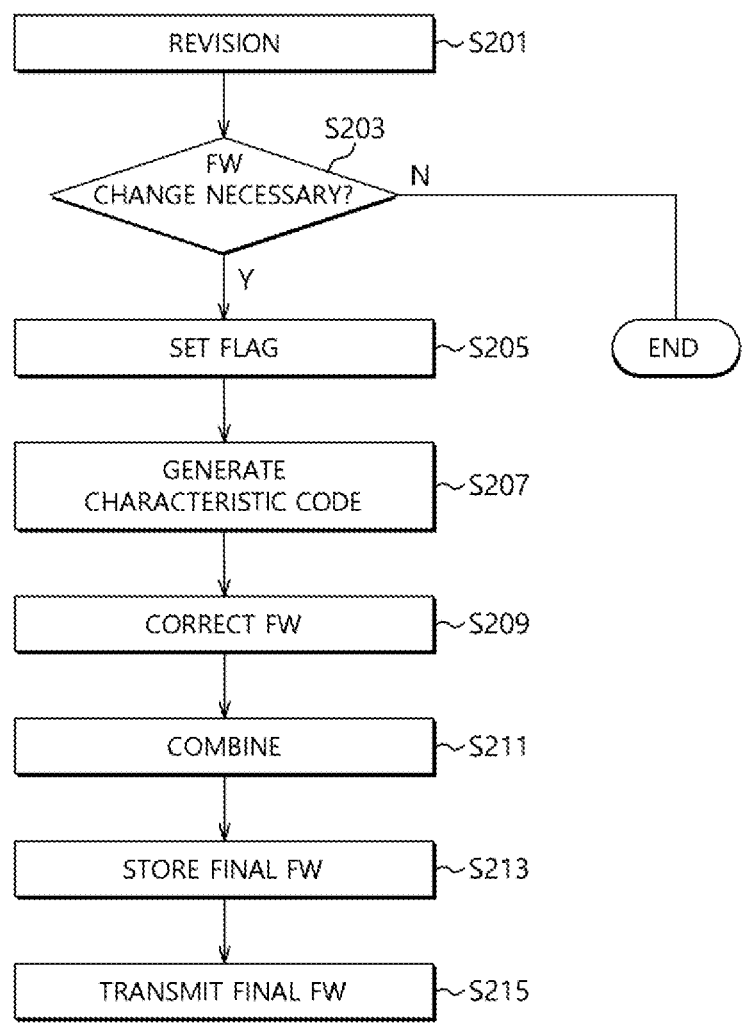
FIG. 7 is a flowchart illustrating another firmware providing method in accordance with an embodiment.

FIG. 7 is a flowchart illustrating a firmware providing method in accordance with an embodiment.

Referring to FIG. 7, revision may be performed after a product is released (operation S201). The revision is a process to find out and compensate for a deficiency such as a bug or a defect.

According to the revision result, it may be determined whether it is necessary to change the firmware for correction of an error in the firmware itself or for improvement in the system performance (operation S203). When it is determined to be necessary to change the firmware (operation S203, Y), the flag setter 240 may determine the flag attribute on the basis of the revision result of the data storage device 10, and store the flag attribute for each revision version of the data storage device 10 (operation S205).

When the flag attribute is determined, the characteristic code generator 260 may generate the characteristic information as a program code, including the flag having the attribute determined according to the revision result (operation S207).

The firmware generator 250 may change the firmware such that the register setting information and the firmware execution code branch information are reflected thereto according to the revision result (operation S209). Accordingly, the firmware (i.e., binary file) may include the register setting information and the firmware execution code branch information for each flag attribute.

The firmware generator 250 may combine the changed firmware and the characteristic code (operation S211). Accordingly, the characteristic code may be included as a part of the firmware.

The firmware including the characteristic code may be stored as final firmware (operation S213).

The firmware providing server 20 may provide (or transmit) the final firmware including the flag characteristic code to the data storage device 10 (operation S215).

In this way, firmware for an initially released product and firmware for a revision product derived therefrom may be unified, and thus management and update therefor may become easy.

Since only one firmware is manufactured and released for an identical product, it is easy for a manufacturer to manage the firmware for each product. For a consumer, since a single piece of firmware provided by the manufacturer is downloaded and used without considering a revision version of the product, it is simple and easy to operate and manage the firmware for each product.

Figure 8:
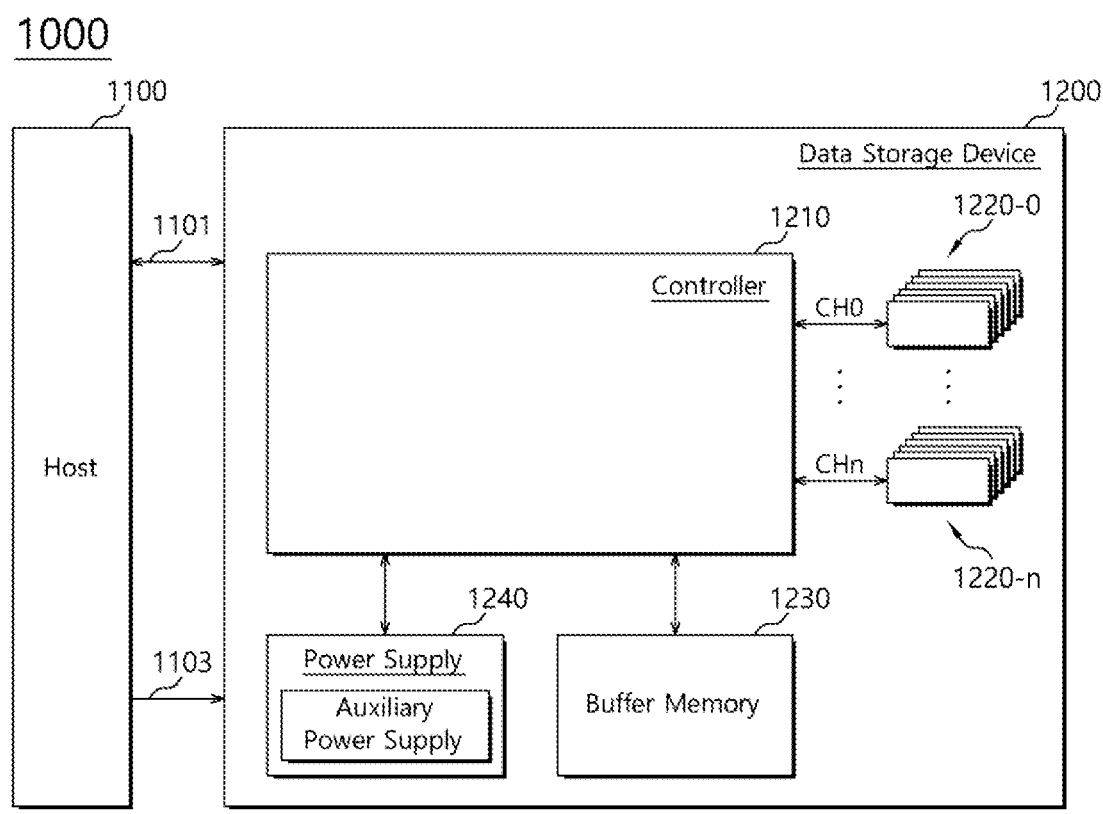
FIG. 8 is a diagram illustrating a data storage system in accordance with an embodiment.

FIG. 8 is a diagram illustrating a data storage system 1000 in accordance with an embodiment.

Referring to FIG. 8, the data storage system 1000 may include a host device 1100 and a data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface, a control component, a random access memory used as a working memory, an error correction code (ECC) component and a memory interface. In an embodiment, the controller 1210 may be implemented by the controller 110 comprising the central processing unit 111 as shown is FIG. 1 and FIG. 3.

The host device 1100 may exchange a signal with the data storage device 1200 through the signal connector 1101. The signal may include a command, an address, data, and the like.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or to at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH1 to CHn, respectively. One or more nonvolatile memory devices may be coupled to one channel. The nonvolatile memory devices coupled to the same channel may be coupled to the same signal bus and data bus.

The power supply 1240 may provide power inputted through the power connector 1103, to the inside of the data storage device 1200. The power supply 1240 may include an auxiliary power supply. The auxiliary power supply may supply power to allow the data storage device 1200 to be properly terminated when a sudden power-off occurs. The auxiliary power supply may include large capacity capacitors.

The signal connector 1101 may be configured by various types of connectors depending on an interface scheme between the host device 1100 and the data storage device 1200.

The power connector 1103 may be configured by various types of connectors depending on a power supply scheme of the host device 1100.

Figure 9:
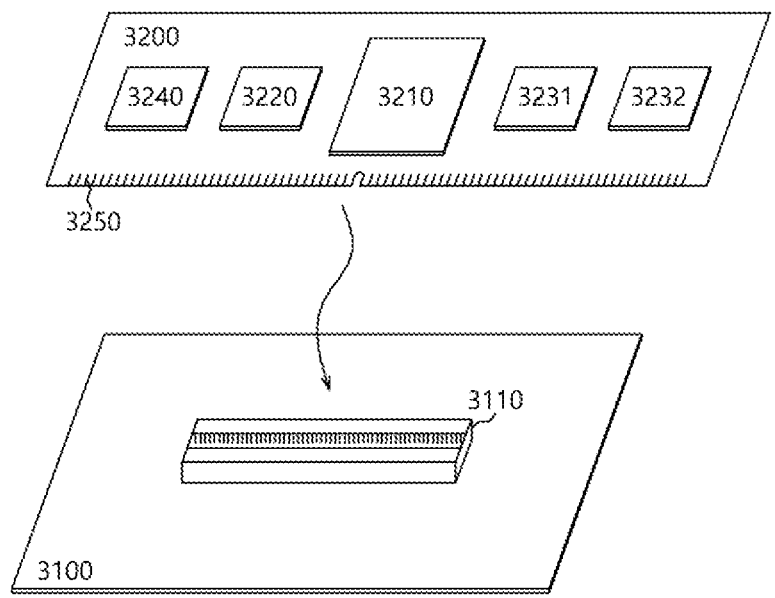
FIG. 9 and FIG. 10 are diagrams illustrating a data processing system in accordance with an embodiment.

FIG. 9 is a diagram illustrating a data processing system 3000 in accordance with an embodiment. Referring to FIG. 9, the data processing system 3000 may include a host device 3100 and a memory system 3200.

The host device 3100 may be configured in the form of a board such as a printed circuit board. Although not shown, the host device 3100 may include internal function blocks for performing the function of a host device.

The host device 3100 may include a connection terminal 3110 such as a socket, a slot or a connector. The memory system 3200 may be mounted to the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be implemented in the same manner as the controller 110 including the central processing unit 111 as shown in FIGS. 1 and 3.

The buffer memory device 3220 may temporarily store data to be stored in the nonvolatile memory devices 3231 and 3232. Further, the buffer memory device 3220 may temporarily store the data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250, to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data and so forth and power may be transferred between the host device 3100 and the memory system 3200. The connection terminal 3250 may be configured into various types depending on an interface scheme between the host device 3100 and the memory system 3200. The connection terminal 3250 may be disposed on any one side of the memory system 3200.

Figure 10:
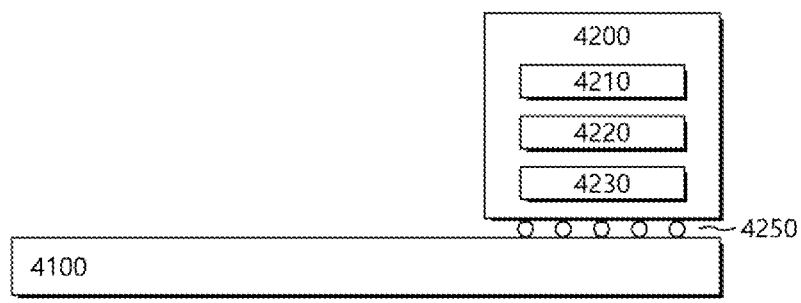

FIG. 10 is a diagram illustrating a data processing system 4000 in accordance with an embodiment. Referring to FIG. 10, the data processing system 4000 may include a host device 4100 and a memory system 4200.

The host device 4100 may be configured in the form of a board such as a printed circuit board. Although not shown, the host device 4100 may include internal function blocks for performing the function of a host device.

The memory system 4200 may be configured in the form of a surface-mounting type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 including the central processing unit 111 as shown in FIGS. 1 and 3.

The buffer memory device 4220 may temporarily store data to be stored in the nonvolatile memory device 4230. Further, the buffer memory device 4220 may temporarily store the data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 11:
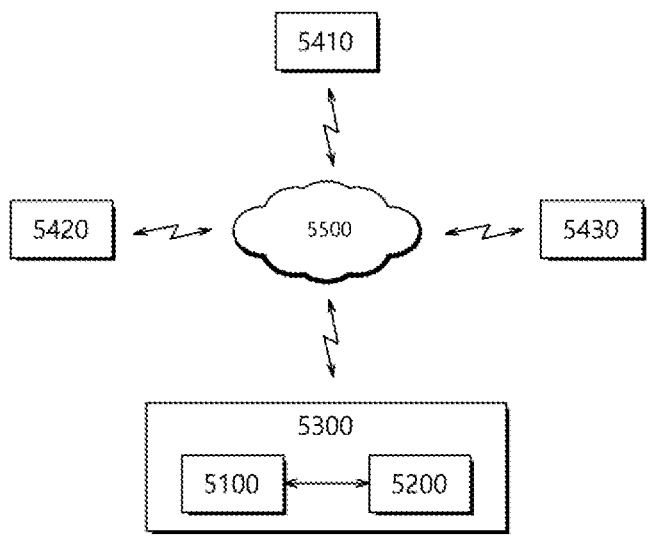
FIG. 11 is a diagram illustrating a network system including a data storage device in accordance with an embodiment.

FIG. 11 is a diagram illustrating a network system 5000 including a data storage device in accordance with an embodiment. Referring to FIG. 11, the network system 5000 may include a server system 5300 and a plurality of client systems 5410 to 5430 which are coupled through a network 5500.

The server system 5300 may service data in response to requests from the plurality of client systems 5410 to 5430. For example, the server system 5300 may store the data provided from the plurality of client systems 5410 to 5430. For another example, the server system 5300 may provide data to the plurality of client systems 5410 to 5430.

The server system 5300 may include a host device 5100 and the memory system 5200. The memory system 5200 may be implemented by the memory system 10 shown in FIG. 1, the data storage device 1200 shown in FIG. 8, the memory system 3200 shown in FIG. 9 or the memory system 4200 shown in FIG. 10.

FIG. 12 is a block diagram illustrating a nonvolatile memory device 300 included in a data storage device in accordance with an embodiment. Referring to FIG. 12, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional (3D) memory array. The three-dimensional memory array has a direction extending perpendicular to the flat surface of a semiconductor substrate. Moreover, the three-dimensional memory array is a structure including NAND strings in which at least memory cell is located in a vertical upper portion of another memory cell.

However, the structure of the three-dimensional memory array is not limited to the above-described arrangement. More generally, the 3D memory array structure can be formed in a highly integrated manner with horizontal directionality as well as vertical directionality.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device

300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been illustrated and described, it will be understood to those skilled in the art in light of the present disclosure that the embodiments described are examples to which various modifications may be made within the scope of the present invention. Accordingly, the data storage device, operating method thereof, and the storage system including the same disclosed herein should not be limited based on the described embodiments. Rather, the present invention encompasses all variations and modifications that fall within the scope of the claims.

What is claimed is:

1. A firmware providing server, which is configured to provide firmware to a data storage device, the firmware providing server comprising a CPU configured to:

determine an attribute of flag information corresponding to a revision version of the data storage device, the flag information including attributes; and generate firmware necessary to operate the data storage device, change the firmware so as to reflect register setting information and firmware execution code branch information according to the revision version of the data storage device, the register setting information and firmware execution code branch information being set for each attribute, and provide the changed firmware and the determined attribute of the flag information to the data storage device.

2. The firmware providing server of claim 1, further comprising a characteristic code generator configured to generate the determined attribute of the flag information as a program code.

3. The firmware providing server of claim 2, wherein the CPU is configured to change the firmware so as to comprise a characteristic code.

4. The firmware providing server of claim 3, wherein the CPU is configured to provide the firmware comprising the characteristic code to the data storage device.

5. The firmware providing server of claim 2, wherein the firmware comprises at least one subprogram, and the firmware execution code branch information is information for defining an execution sequence of the at least one subprogram.

6. The firmware providing server of claim 5, wherein the characteristic code is linked with the at least one subprogram to be stored as the firmware.

* * * * *